US012776700B2

(12) United States Patent
Ikari et al.

(10) Patent No.: US 12,776,700 B2
(45) Date of Patent: Oct. 27, 2026

(54) POWER CONVERSION DEVICE, AND METHOD OF CONTROLLING THEREOF

(71) Applicants: NISSAN MOTOR CO., LTD., Yokohama (JP); RENAULT s.a.s., Boulogne-Billancourt (FR)

(72) Inventors: Takayuki Ikari, Kanagawa (JP); Shigeharu Yamagami, Kanagawa (JP); Giorgio Lovison, Kanagawa (JP); Yoshikazu Kuwabara, Kanagawa (JP)

(73) Assignees: NISSAN MOTOR CO., LTD., Yokohama (JP); RENAULT s.a.s., Boulogne-Billancourt (FR)

( * ) Notice: Subject to any disclaimer, the term of this patent is extended or adjusted under 35 U.S.C. 154(b) by 48 days.

(21) Appl. No.: 18/866,472

(22) PCT Filed: May 17, 2022

(86) PCT No.: PCT/IB2022/000282

§ 371 (c)(1),
(2) Date: Nov. 15, 2024

(87) PCT Pub. No.: WO2023/223063

PCT Pub. Date: Nov. 23, 2023

(65) Prior Publication Data

US 2025/0330081 A1 Oct. 23, 2025

(51) Int. Cl.
*H02M 1/10* (2006.01)
*H02M 7/217* (2006.01)
*H02M 7/48* (2007.01)

(52) U.S. Cl.
CPC ............. *H02M 1/10* (2013.01); *H02M 7/217* (2013.01); *H02M 7/4815* (2021.05); *H02M 7/4826* (2013.01)

(58) Field of Classification Search
CPC ...... H02M 1/10; H02M 1/0058; H02M 7/217; H02M 7/4807; H02M 7/4815; H02M 7/4826; H02M 3/01; H02M 3/158
(Continued)

(56) References Cited

U.S. PATENT DOCUMENTS 6,294,900 B1 9/2001 Greenwood et al.
11,527,965 B2 * 12/2022 Hayashi .................. H02M 3/01
(Continued)

FOREIGN PATENT DOCUMENTS

JP 2017-073901 A 4/2017
JP 2019-525707 A 9/2019

OTHER PUBLICATIONS

Garcia Jose A et al: "Class-E Rectifiers and Power Converters: The Operation of the Class-E Topology as a Power Amplifier and a Rectifier with Very High Conversion Efficiencies", IEEE Microwave Magazine, IEEE Service Center, Piscataway, NJ, US, vol. 19, No. 5, Jul. 2018, pp. 67-78, XP011684563, ISSN: 1527-3342.
(Continued)

*Primary Examiner* — Yemane Mehari
(74) *Attorney, Agent, or Firm* — Foley & Lardner LLP

(57) ABSTRACT

Provided are a first conversion circuit having a first switching element for converting a power input from an input terminal into first AC power; and a second conversion circuit having a second switching element for selecting polarity of an output, converting the first AC power input from the first conversion circuit and outputting it to the output terminal. It is determined whether an input power to the input terminal is AC or DC and the operation of the first switching element and the second switching is controlled so that the second conversion circuit outputs DC power when it is determined that the input power is AC. The operation of the first switching element and the second switching element is
(Continued)

controlled so that the second conversion circuit outputs a DC current or second AC power when it is determined that the input power is DC.

14 Claims, 7 Drawing Sheets

(58) Field of Classification Search
USPC ........................................................ 363/65
See application file for complete search history.

(56) References Cited

U.S. PATENT DOCUMENTS

| | | | | |
|---|---|---|---|---|
| 12,278,570 | B2 * | 4/2025 | Zhang | H02M 1/0058 |
| 2012/0001599 | A1 * | 1/2012 | Tanaka | H02M 1/4208<br>323/205 |
| 2018/0301995 | A1 * | 10/2018 | Chang | H02M 3/01 |
| 2019/0176652 | A1 | 6/2019 | Teng et al. | |

OTHER PUBLICATIONS

Mahdi Hussein et al: "A Class-E-Based Resonant AC-DC Converter With Inherent PFC Capability", IEEE Access, IEEE, USA, vol. 9, Mar. 22, 2021, pp. 46664-46673, XP011847246.

* cited by examiner

POWER CONVERSION DEVICE, AND METHOD OF CONTROLLING THEREOF

TECHNICAL FIELD

The present invention relates to a power conversion device, and a method of controlling thereof.

BACKGROUND ART

There is a demand for a bidirectional power conversion device capable of connecting AC power supplied from a power system to an input terminal, connecting a load such as a storage battery to an output terminal, converting the AC power and supplying it to an output terminal, and capable of supplying power from the storage battery connected to the output terminal to the input terminal.

Such a power conversion device has a function as a battery charger for charging a storage battery of an electric vehicle from AC power, for example, and can also supply power from the storage battery of an electric vehicle to the input terminal.

A power conversion device disclosed in Patent Literature 1 includes a first conversion circuit having a switching element provided on an input terminal side and a second conversion circuit having a switching element provided on an output terminal side. The power conversion device enables bidirectional power conversion by switching operating states of the first conversion circuit and the second conversion circuit.

In this bidirectional power conversion device, when power is supplied from an input terminal to an output terminal, an inverter circuit arranged on the input terminal side generates a high-frequency current, and a rectifier arranged on the output terminal side rectifies the high-frequency current and outputs it to the output terminal.

When power is supplied from an output terminal to an input terminal, an inverter circuit on the output terminal side generates a high-frequency current, and a rectifier arranged on the input terminal side rectifies the high-frequency current and outputs it to the input terminal side.

Generally, an inverter and a rectifier are not provided on an input side and an output side, but each inverter circuit functions as a rectifier.

CITATION LIST

Patent Literature

Patent Literature 1: Japanese Unexamined Patent Application Publication No. JP2019-525707

SUMMARY OF INVENTION

Problems to be Solved

However, in such a bidirectional power conversion device, either the inverter on the input side or inverter on the output side is required to perform a high-frequency switching operation, depending on the direction of power conversion. Therefore, it is required that both of the first conversion circuit and the second conversion circuit correspond to high-frequency switching operation, which increases cost.

An object of the present invention is to provide a power conversion device and a method of controlling thereof which can reduce costs.

Solution to Problem

A method of controlling a power conversion device according to the present invention controls operation of a first switching element and a second switching element of a power conversion device, which includes a first conversion circuit having a first switching element for switching at a high speed and a second conversion circuit having a second switching element. The first conversion circuit converts power input from an input terminal into first AC power. A second switching element selects a polarity of an output. The second conversion circuit converts the first AC power input from the first conversion circuit and outputs it to an output terminal.

The method of controlling a power conversion device determines whether the input power to an input terminal is AC or DC, and controls the operation of the first switching element and the second switching element so that the second conversion circuit outputs DC power when it is determined that the input power is AC. When it is determined that the input power is DC, the operation of the first switching element and the second switching element is controlled so that the second conversion circuit outputs the DC power or second AC power.

Advantageous Effects

According to the present invention, it is possible to provide a power conversion device and a method of controlling thereof which can reduce costs.

DESCRIPTION OF EMBODIMENTS

Figure 1:
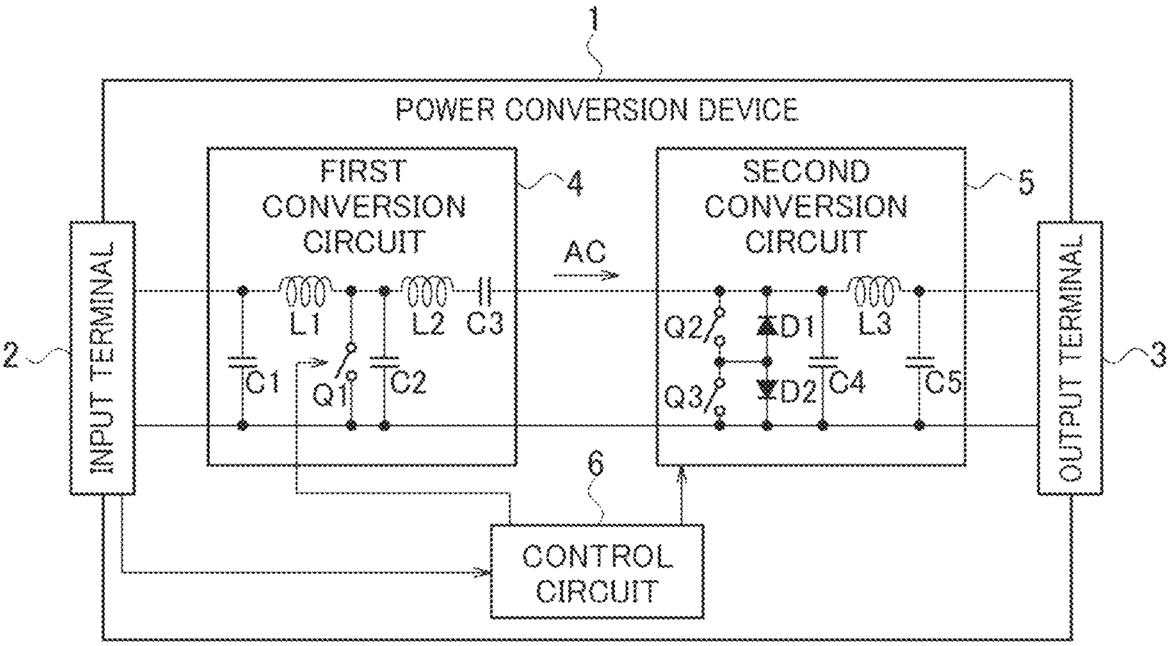
FIG. 1 is a block diagram showing a configuration of a power conversion device according to a first embodiment of the present invention.

Hereinafter, a power conversion device, and a method of controlling thereof, according to several embodiments of the present invention will be described in detail with reference to the drawings. In the drawings, the same or corresponding parts of the power conversion device, and the method of controlling thereof, according to the embodiments will be denoted by the same reference signs, and the description thereof will be omitted.

First Embodiment

FIG. 1 is a block diagram showing a configuration of a power conversion device according to a first embodiment of the present invention. The power conversion device 1 according to the first embodiment includes an input terminal 2, an output terminal 3, a first conversion circuit 4, a second conversion circuit 5, and a control circuit 6.

When an electric vehicle is charged from AC power, the power conversion device 1 inputs AC power to the input terminal 2, and connects a storage battery of the electric vehicle to the output terminal 3. When external power is supplied from the electric vehicle, the power conversion device 1 connects the storage battery of the electric vehicle to the input terminal 2, and outputs DC power or AC power from the output terminal 3.

Since both AC and DC power can be connected to the input terminal 2, the control circuit 6 detects and determines whether the power connected to the input is AC or DC by use of a voltage sensor or the like.

The first conversion circuit 4 is a voltage resonant inverter circuit having a switching element Q1 that switches at a high speed, converts the power input from the input terminal 2 into first AC power, and outputs the first AC power to the second conversion circuit 5. The first conversion circuit 4 generates a high-frequency AC when the switching element Q1 repeatedly turns on and off at a high frequency.

The first conversion circuit 4 has capacitors C1, C2, and C3, an inductor L1 disposed between the switching element Q1 and an AC voltage input, and an LC resonance circuit disposed between the switching element Q1 and the output of the first conversion circuit 4. The LC resonance circuit includes an inductor L2 and a capacitor C3. The capacitor C2 is connected in parallel with the switching element Q1 and may be a parasitic capacitance of the switching element Q1.

The first conversion circuit 4 is voltage-resonated by the LC resonance circuit including the inductor L2 and the capacitor C3 to achieve zero-voltage switching when the switching element Q1 is turned on, thereby reducing the switching loss of the switching element Q1.

The switching element Q1 is configured by a unipolar transistor such as a metal-oxide-semiconductor field-effect transistor (MOSFET), for example. The switching element Q1 switches between turning on and turning off according to an on/off control signal from the control circuit 6. The switching frequency of the switching element Q1 is, for example, several hundred kHz or 1 MHz to 10 MHz.

The second conversion circuit 5 has switching elements Q2 and Q3 capable of selecting the polarity of the output. The second conversion circuit 5 converts the first AC power input from the first conversion circuit 4 and outputs it to the output terminal 3.

In its role of selecting the polarity of the voltage output to the output terminal 3, the second conversion circuit 5 turns on the switching element Q2 on a P-side, and turns off the switching element Q3 on an N-side, when a positive voltage is output to the output terminal 3. The second conversion circuit 5 turns on the switching element Q3 on the N-side, and turns off the switching element Q2 on the P-side, when a negative voltage is output to the output terminal 3. As a result, the second conversion circuit 5 outputs DC power, or second AC power with a frequency lower than the frequency of the first AC power, from the first conversion circuit 4. The frequency of the second AC power is, for example, the frequency of the AC power supply, 50 Hz.

In the second conversion circuit 5, one end of the switching element Q2, a cathode of a diode D1, and one end of the capacitor C4 are connected to one input terminal of the second conversion circuit 5. An anode of a diode D2 and one end of the switching element Q3 are connected to the other end of the switching element Q2. A cathode of the diode D2 and the other end of the capacitor C4 are connected to the other end of the switching element Q3. A series circuit of an inductor L3 and a capacitor C5 is connected to both ends of the capacitor C4, and both ends of the capacitor C5 are connected to the output terminal 3.

The diodes D1 and D2 and the switching elements Q2 and Q3 function as a rectifier that rectifies high-frequency AC power from the first conversion circuit 4.

Figure 2:
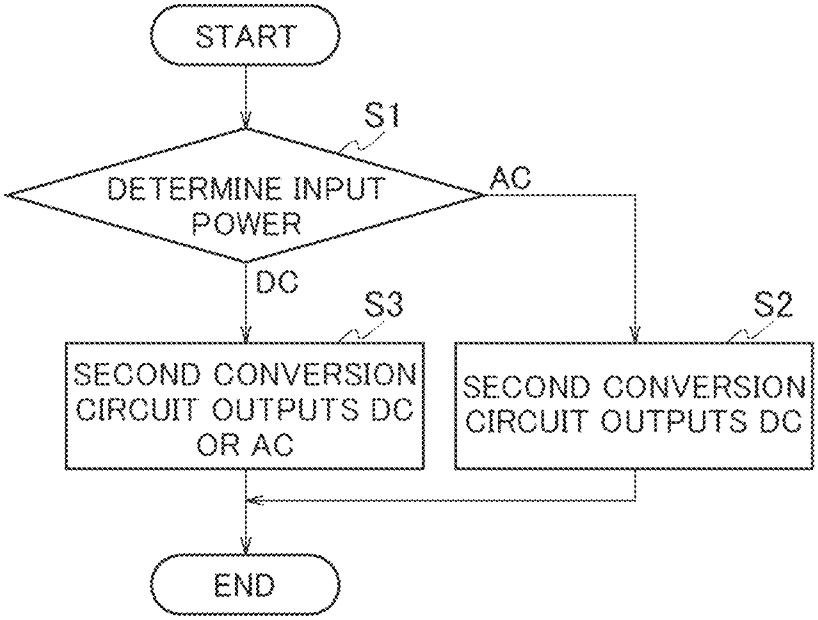
FIG. 2 is a flowchart showing a method of controlling a power conversion device according to the first embodiment of the present invention.

The control circuit 6 controls operation of the switching elements Q1 and Q2. FIG. 2 is a flowchart showing a method of controlling a power conversion device according to the first embodiment of the present invention. The method of controlling a power conversion device is realized by the operation of the control circuit 6. The method of controlling a power conversion device will be described with reference to FIG. 2.

The control circuit 6 determines whether the input power to the input terminal 2 is AC or DC (step S1). In step S1, when the control circuit 6 determines that the input power is AC, it controls the operation of the switching elements Q1 and Q2 so that the second conversion circuit 5 outputs DC power (step S2).

At this point, the control circuit 6 causes the switching element Q1 of the first conversion circuit 4 to switch at a high speed to generate high-frequency AC power (first AC power) and output it to the second conversion circuit 5. The control circuit 6 controls the rectification directions of the switching elements Q2 and Q3 so that the power output from the second conversion circuit 5, which has a rectifier for rectifying the high-frequency AC power from the first conversion circuit 4, becomes DC.

In step S1, when the control circuit 6 determines that the input power is a DC, it controls the operation of the switching elements Q1 and Q2 so that the second conversion circuit 5 outputs DC, or the second AC power (step S3). The frequency of the second AC power is lower than the frequency of the first AC power.

At this time, the control circuit 6 causes the switching element Q1 of the first conversion circuit 4 to switch at a high speed to generate the high-frequency AC power (first AC power) and output it to the second conversion circuit 5. The control circuit 6 controls the rectification directions of the switching elements Q2 and Q3 so that the power output from the second conversion circuit 5, which has a rectifier for rectifying the high-frequency AC power from the first conversion circuit 4, becomes DC or becomes the second AC power.

With the power conversion device according to the first embodiment, the switching element Q1 performs high-frequency switching when the input power is either AC or DC, and the switching elements Q2 and Q3 need not perform high-frequency switching. That is, the power conversion device, which has a function of outputting DC power with AC power as input, and a function of outputting DC power or AC power with DC power as input, can be realized at a low cost.

Further, the first conversion circuit 4 controls the voltage and current according to requirements and restrictions from a power supply connected to the input terminal 2, and according to restrictions of a load connected to the output terminal 3. Thus, only the first conversion circuit 4 consisting of the inverter circuit arranged at the input terminal 2 needs to perform a high-frequency switching operation for charging and external power supply. The second conversion circuit 5 having the rectifier always performs only a rectifying operation. Thus, a high-cost switching element capable of high-frequency operation is not used for the rectifier, and charging and external power supply can be realized by a single power conversion device.

In addition, the voltage resonant inverter circuit of the conversion circuit 4 arranged on an input terminal side performs a switching operation when the input power is either AC or DC, so that low-loss switching can be realized.

Second Embodiment

Figure 3:
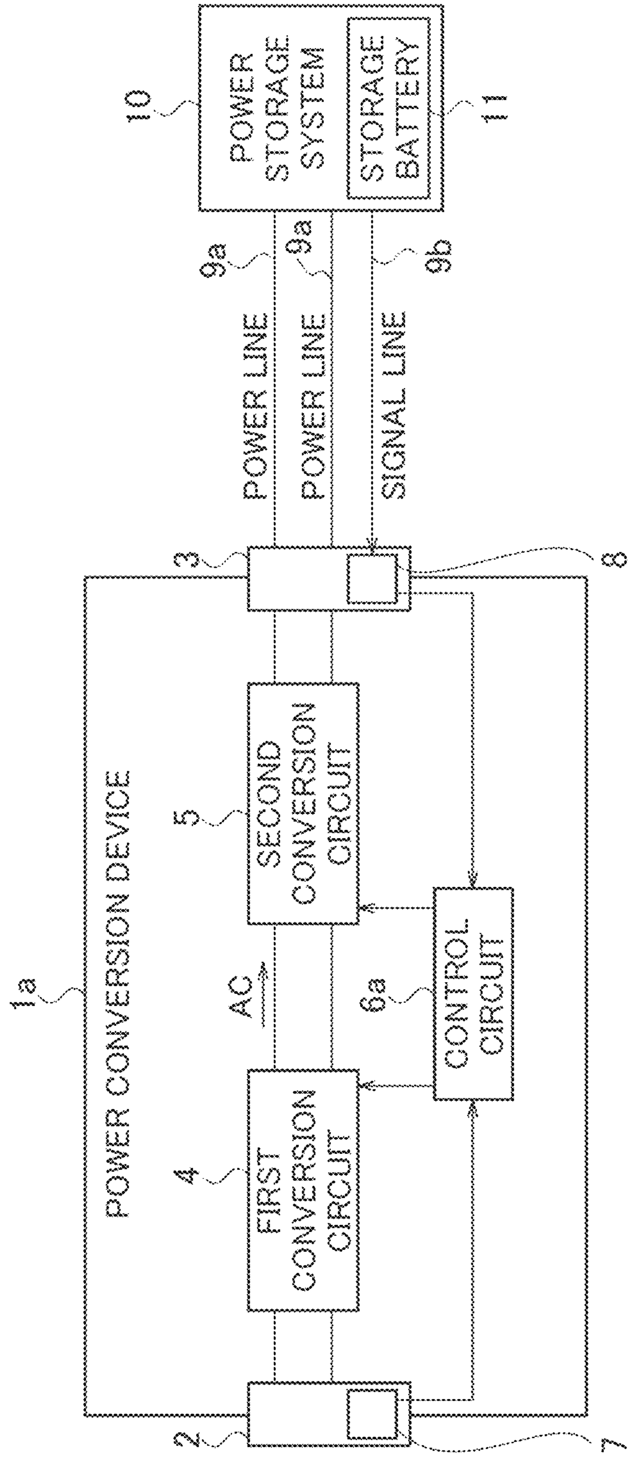
FIG. 3 is a block diagram showing a configuration of a power conversion device according to a second embodiment of the present invention.

FIG. 3 is a block diagram showing a configuration of a power conversion device according to a second embodiment of the present invention. The power conversion device according to the second embodiment further includes a first communication interface 7 and a second communication interface 8 as compared with the power conversion device according to the first embodiment shown in FIG. 1.

The first communication interface 7 is provided inside the input terminal 2 and communicates with the outside. The second communication interface 8 is provided inside the output terminal 3 and communicates with the outside. A power storage system 10 has a storage battery 11.

The output terminal 3 is connected to the power storage system 10 via two power lines 9*a*. The two power lines 9*a* supply power from the second conversion circuit 5 to the storage battery 11 via the output terminal 3 and the two power lines 9*a*.

A signal line 9*b* is connected to the second communication interface 8 and the power storage system 10. A control circuit 6*a* communicates with the power storage system 10 via the second communication interface 8 and the signal line 9*b*.

In some cases, the power storage system 10 is connected to the input terminal 2 via the two power lines 9*a*, and the signal line 9*b* is connected to the first communication interface 7 and the power storage system 10. At this time, the control circuit 6*a* communicates with the power storage system 10 via the first communication interface 7 and the signal line 9*b*.

Figure 4:
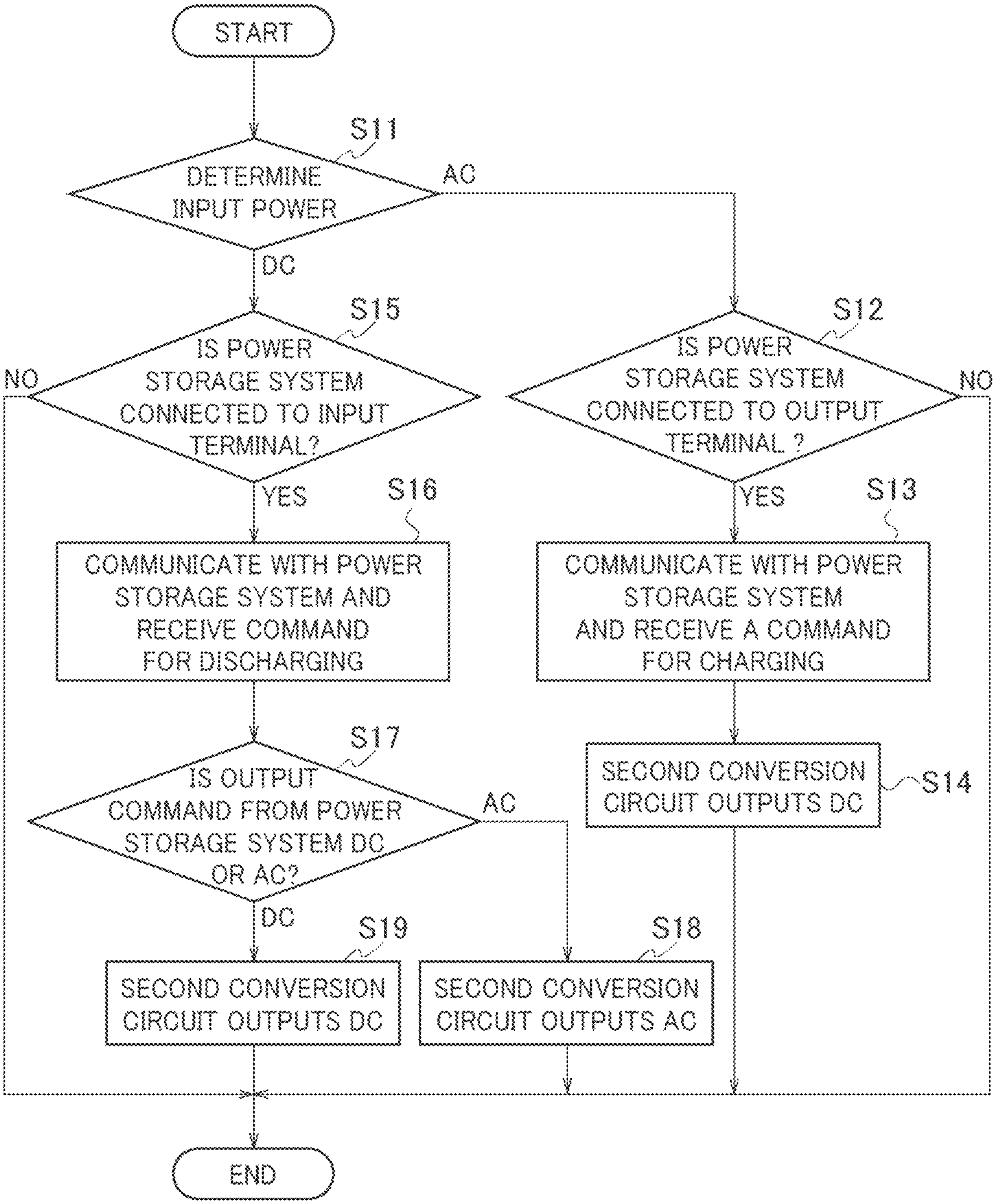
FIG. 4 is a flowchart showing a method of controlling a power conversion device according to the second embodiment of the present invention.

Next, a method of controlling a power conversion device according to the second embodiment configured in this way will be described in detail with reference to a flowchart shown in FIG. 4. The method of controlling the power conversion device is realized by the control using the control circuit 6*a*.

First, the control circuit 6*a* determines whether the input power to the input terminal 2 is AC or DC (step S11). If the control circuit 6*a* determines in step S11 that the power input is AC, it determines whether the power storage system 10 is connected to the output terminal 3 (step S12). The control circuit 6*a* detects whether the power storage system 10 is connected to the output terminal 3 by use of a voltage sensor or the like.

If the power storage system 10 is connected in step S12, the control circuit 6*a* communicates with the power storage system 10 via the signal line 9*b* and the second communication interface 8, and receives a command for charging from the power storage system 10 (step S13).

In response to the command for charging from the power storage system 10, the control circuit 6*a* controls the operation of the switching elements Q1 and Q2 so that the second conversion circuit 5 outputs DC power to control charging of the storage battery 11 (step S14).

If the control circuit 6*a* determines in step S11 that the input power is DC, it then determines whether the power storage system 10 is connected to the input terminal 2 (step S15). In step S15, the control circuit 6*a* detects and determines whether the power storage system 10 is connected to the input terminal 2 by use of a voltage sensor or the like.

In step S15, when the power storage system 10 is connected, the control circuit 6*a* communicates with the power storage system 10 via the signal line 9*b* and the first communication interface 7, and receives a command for discharge from the power storage system 10 (step S16).

The control circuit 6*a* determines whether the command for discharge, that is, an output command from the power storage system 10, is DC or AC (step S17). In step S17, when the control circuit 6*a* determines that the output command is AC, it controls the operation of the switching element Q1 and the switching elements Q2 and Q3 so that the second conversion circuit 5 outputs AC to the output terminal 3 (step S18).

In this case, the switching element Q1 is switched at a high speed to convert DC to AC with a high frequency, and the converted AC with the high frequency is converted to AC with a low frequency by operating the switching elements Q2 and Q3 at a low speed.

In step S17, when the control circuit 6*a* determines that the output command is DC, it controls the operation of the switching element Q1, and the switching elements Q2 and Q3, so that the second conversion circuit 5 outputs DC to the output terminal 3 (step S19).

In this case, the switching element Q1 is switched at a high speed to convert DC to a high-frequency AC, and the converted high-frequency AC is converted into DC by causing the switching elements Q2 and Q3 to perform rectification operation.

That is, when the power storage system 10 having the storage battery 11 is connected to the input terminal 2, the operation of the switching element Q1, and the switching elements Q2 and Q3, is controlled so as to control the output from the storage battery 11 to the output terminal 3.

According to a drive circuit of the second embodiment, when an external power source or an external load such as the storage battery 11 is connected to the input terminal 2 or the output terminal 3, the control circuit 6*a* communicates with the power storage system 10 via the first communication interface 7 or the second communication interface 8. Based on a communication result, the control circuit 6*a* can control the operation of the switching element Q1, and the switching elements Q2 and Q3, so as to operate within a range in which the external power source can output and the external load can receive.

When the AC power is connected to the input terminal 2 and the power storage system 10 is connected to the output terminal 3, the control circuit 6*a* communicates with the power storage system 10. The operation of the switching element Q1, and the switching elements Q2 and Q3, can be controlled in consideration of charging conditions and procedures required by the power storage system 10.

When the power storage system 10 is connected to the input terminal 2, the control system 6*a* communicates with the power storage system 10 connected to the input terminal 2. The operation of the switching element Q1, and the switching elements Q2 and Q3, can be controlled in consideration of discharging conditions and procedures provided by the power storage system 10.

When the power storage system 10 is connected to the input terminal 2 and supplies power to an output side, either DC or AC can be selected and output to the output terminal 3 in accordance with an instruction from the power storage system. A user can select the power obtained from the output of the power conversion device by commanding the power storage system 10 to output either DC or AC.

Third Embodiment

Figure 5:
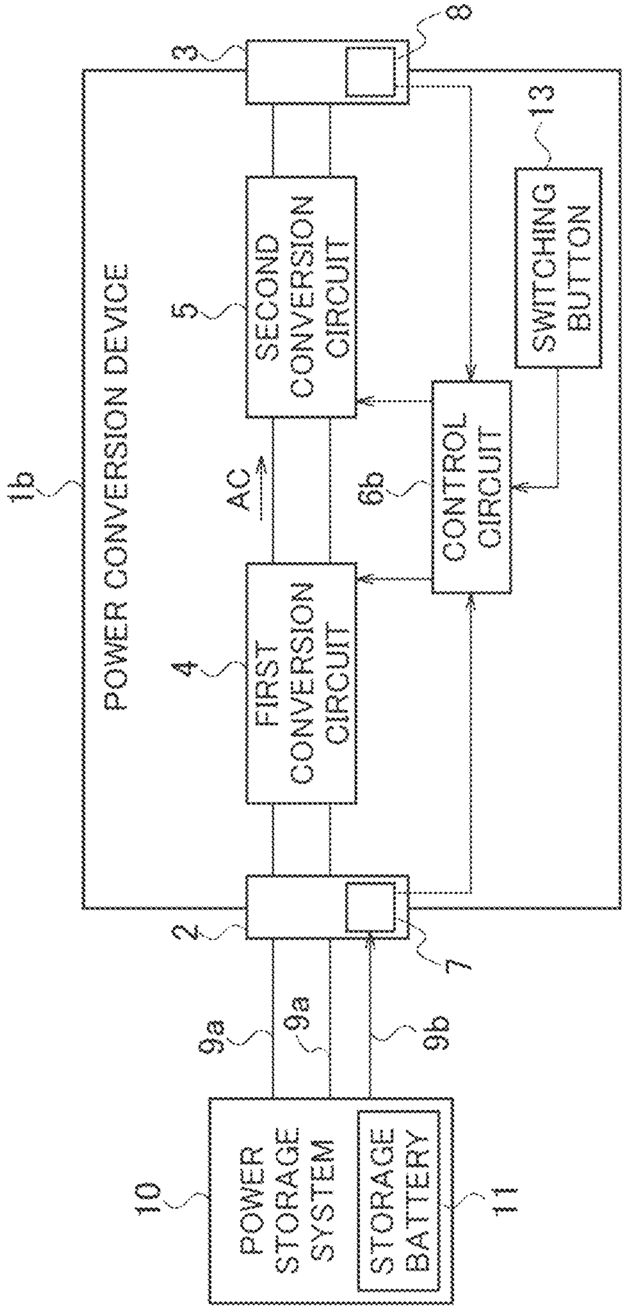
FIG. 5 is a block diagram showing a configuration of a power conversion device according to a third embodiment of the present invention.

FIG. 5 is a block diagram showing a configuration of a power conversion device according to a third embodiment of the present invention. The power conversion device according to the third embodiment further includes the first communication interface 7, the second communication interface 8, and a switching button 13 as compared with the power conversion device according to the first embodiment shown in FIG. 1.

The input terminal 2 is connected to the power storage system 10 having the storage battery 11 via the two power lines 9*a*. The signal line 9*b* is connected to the first communication interface 7 and the power storage system 10. The control circuit 6*b* communicates with the power storage system 10 via the signal line 9*b* and the first communication interface 7.

The switching button 13 is a button that can be operated by a user. The user selects whether to output DC power or AC power to the output terminal 3, and a switching selection signal is output to the control circuit 6*b*. Instead of the switching button 13, another interface operable by the user, such as a dial or a touch panel, may be provided.

When DC power is selected based on the switching selection signal from the switching button 13, the control circuit 6*b* controls the operation of the switching element Q1 and the switching elements Q2 and Q3 so that DC power is output to the output terminal 3. The control circuit 6*b* controls the operation of the switching element Q1 and the switching elements Q2 and Q3 so that AC power is output to the output terminal 3 when AC power is selected.

With to the power conversion device according to the third embodiment, when the power storage system 10 is connected to the input terminal 2 to supply power to an output side, either DC or AC can be selected, and output to the output terminal 3, by the switching button 13 that is included in the power conversion device 1*b*. The user can select the power obtained from the output of the power conversion device by directly operating the switching button 13.

Fourth Embodiment

Figure 6:
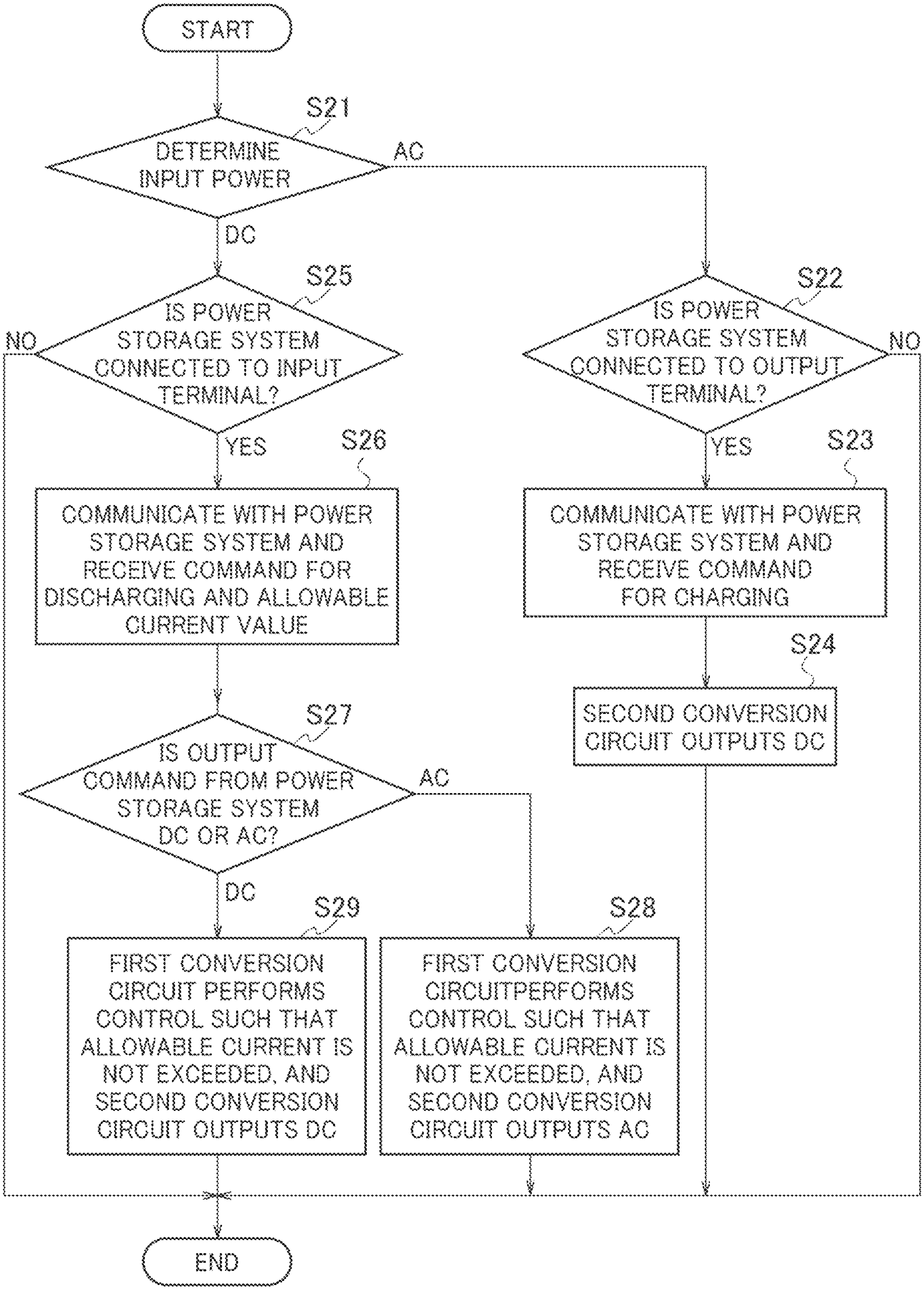
FIG. 6 is a flowchart showing a method of controlling a power conversion device according to a fourth embodiment of the present invention.

FIG. 6 is a flowchart showing a method of controlling a power conversion device according to a fourth embodiment of the present invention. The method of controlling the power conversion device according to the fourth embodiment will be described in detail with reference to the flowchart shown in FIG. 6. The method of controlling the power conversion device is realized by operation of a control circuit 6*c*.

First, the control circuit 6*c* determines whether the input power to the input terminal 2 is AC or DC (step S21). In step S21, when the control circuit 6*c* determines that the input power is AC, it determines whether the power storage system 10 is connected to the output terminal 3 (step S22). Whether or not the power storage system 10 is connected to the output terminal 3 is determined by use of a voltage sensor or the like.

In step S22, when the power storage system 10 is connected, the control circuit 6*c* communicates with the power storage system 10 via the signal line 9*b* and the second communication interface 8, and receives a command for charging from the power storage system 10 (step S23).

In response to the command for charging from the power storage system 10, the control circuit 6*c* controls the operation of the switching element Q1 and the switching element Q2 so that the second conversion circuit 5 outputs DC power and controls charging of the storage battery 11 (step S24).

In step S21, when the control circuit 6*c* determines that the input power is DC, the control circuit 6*c* determines whether the power storage system 10 is connected to the input terminal 2 (step S25). In step S25, it a detection and determination is made whether the power storage system 10 is connected to the input terminal 2 by use of a voltage sensor or the like.

In step S25, when the power storage system 10 is connected, the control circuit 6*c* communicates with the power storage system 10 via the signal line 9*b* and the first communication interface 7, and receives a command for discharging and an allowable current value from the power storage system 10 (step S26).

The control circuit 6*c* determines whether the command for discharging, that is, the output command from the power storage system 10 is DC or AC (step S27). When the control circuit 6*c* determines that the output command is AC, it controls the operation of the switching element Q1, and the switching elements Q2 and Q3, so that the first conversion circuit 4 performs control whereby the allowable current is not exceeded, and the second conversion circuit 5 outputs AC to the output terminal 3 (step S28).

In this case, the first conversion circuit 4 changes operating power by varying a switching frequency of the switching element Q1. When the power (current) is increased, the switching frequency is decreased, and when the power (current) is decreased, the switching frequency is increased.

The first conversion circuit 4 controls the switching frequency to an appropriate value so that the current supplied from the power storage system does not exceed the allowable current value transmitted from the power storage system.

In step S27, when the control circuit 6*c* determines that the output command is DC, the first conversion circuit 4 controls the operation of the switching element Q1 such that the allowable current is not exceeded. The second conversion circuit 5 controls the operation of the switching elements Q2 and Q3 so as to output the direct current to the output terminal 3 (step S29).

In the power conversion device according to the fourth embodiment, when the power storage system 10 is connected to the input terminal 2 and power is supplied to the output side, the power storage system 10 receives information on the allowable current value. The current that can be output by the storage battery 11 varies depending on various factors such as a charging state, temperature, and a deterioration degree of the storage battery 11. The control circuit 6*c* can control the operation of the switching element Q1, and the switching elements Q2 and Q3, so that the input current of the power conversion device does not exceed the allowable current of the power storage system 10 at the point in time.

When the power storage system 10 is connected to the input terminal 2, and the power storage system 10 is also connected to the output terminal 3, the control circuit 6*c* communications with both the power storage system 10 on the input side and the power storage system 10 on the output side. The control circuit 6*c* can control the operation of the switching element Q1, and the switching elements Q2 and Q3, in consideration of conditions and procedures for charging and discharging the power storage system 10 on the input side, and the power storage system 10 on the output side.

Fifth Embodiment

Figure 7:
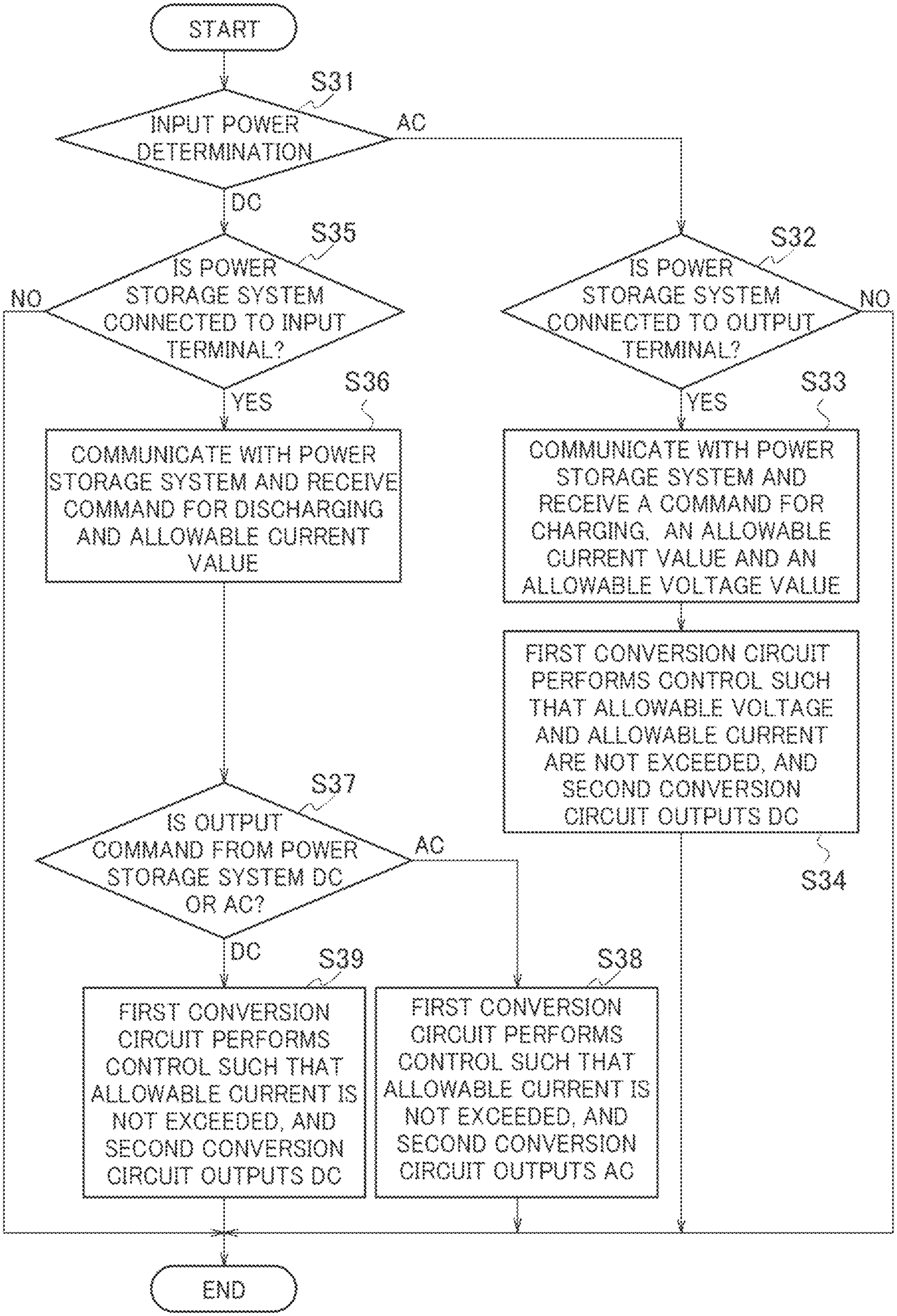
FIG. 7 is a flowchart showing a method of controlling a power conversion device according to a fifth embodiment of the present invention.

FIG. 7 is a flowchart showing a method of controlling a power conversion device according to a fifth embodiment of the present invention. A method of controlling a power conversion device according to a fifth embodiment will be described in detail with reference to the flowchart shown in FIG. 7. The method of controlling the power conversion device is realized by operation of a control circuit 6*d.*

First, the control circuit 6*d* determines whether the input power to the input terminal 2 is AC or DC (step S31). If the control circuit 6*d* determines in step S31 that the power input is AC, it determines whether the power storage system 10 is connected to the output terminal 3 (step S32). Whether or not the power storage system 10 is connected to the output terminal 3 is detected and determined by use of a voltage sensor or the like.

If the power storage system 10 is connected in step S32, the control circuit 6*d* communicates with the power storage system 10 via the signal line 9*b* and the second communication interface 8. The control circuit 6*d* receives a command for charging, an allowable current value and an allowable voltage value from the power storage system 10 (step S33).

The control circuit 6*d* controls the operation of the switching elements Q1 and Q2 so that the first conversion circuit 4 performs control whereby the allowable voltage and the allowable current are not exceeded, and the second conversion circuit 5 outputs DC power (step S34).

When the control circuit 6*d* determines in step S31 that the input power is DC, it determines whether the power storage system 10 is connected to the input terminal 2 (step S35). In step S35, the control circuit 6*d* detects and determines whether the power storage system 10 is connected to the input terminal 2 by use of a voltage sensor or the like.

If the power storage system 10 is connected in step S35, the control circuit 6*d* communicates with the power storage system 10 via the signal line 9*b* and the first communication interface 7, and receives a command for discharging and an allowable current value from the power storage system 10 (step S36).

The control circuit 6*d* determines whether the command for discharge, that is, the output command from the power storage system 10 is DC or AC (step S37). When the control circuit 6*d* determines that the output command is AC, the first conversion circuit 4 controls the operation of the switching element Q1 so that the allowable current is not exceeded. The second conversion circuit 5 controls the operation of the switching elements Q2 and Q3 so that AC is output to the output terminal 3 (step S38).

In this case, the first conversion circuit 4 changes the operating power by varying a switching frequency of the switching element Q1. When the power (current) is increased, the switching frequency is decreased, and when the power (current) is decreased, the switching frequency is increased.

The first conversion circuit 4 controls the switching frequency to an appropriate value so that the power supplied from the power storage system does not exceed the allowable current value transmitted from the power storage system.

In step S37, when the control circuit 6*d* determines that the output command is DC, the first conversion circuit 4 controls the operation of the switching element Q1 such that the allowable current is not exceeded. The second conversion circuit 5 controls the operation of the switching elements Q2 and Q3 so as to output DC to the output terminal 3 (step S39).

In the power conversion device according to the fifth embodiment, the current that can be output by the power storage system 10 on the input side and the voltage and current that can be received by the power storage system 10 on the output side vary, depending on various factors such as a charging state, temperature, and a deterioration degree of the storage battery 11. The control circuit 6*d* can control the operation of the switching elements Q1, Q2, and Q3 so that the input current does not exceed the allowable current of the power storage system 10 on the input side, and so that the output voltage and the output current do not exceed the allowable input voltage and the allowable input current of the power storage system 10 on the output side.

The input terminal 2 and the output terminal 3 may be formed in the same size. In this case, a cable having the same shape can be used when connecting to an external DC load for outputting DC power to the output terminal 3 and when connecting to an external DC power source for inputting DC power to the input terminal 2.

Sixth Embodiment

Figure 8:
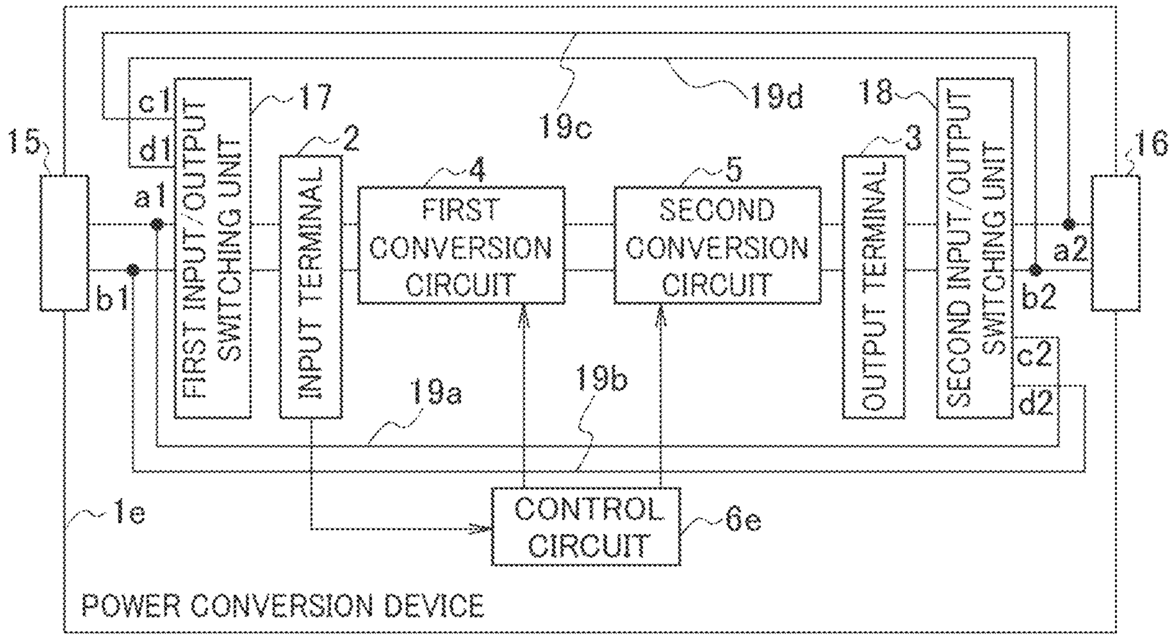
FIG. 8 block diagram showing a configuration of a power conversion device according to a sixth embodiment of the present invention.

FIG. 8 is a block diagram showing a configuration of a power conversion device according to a sixth embodiment of the present invention. There is a power conversion device, such as a charger mounted on a vehicle, which is used with terminals fixed in advance. In this case, a user cannot easily switch between the input and the output.

A power conversion device 1*e* according to the sixth embodiment switches between the input and the output in the power conversion device by a first input/output switching unit 17 and a second input/output switching unit 18. The power conversion device 1*e* further includes terminals 15 and 16, the first input/output switching unit 17, and the second input/output switching unit 18 in the configuration of the power conversion device according to the first embodiment.

The first input/output switching unit 17 is disposed between the terminal 15 and the input terminal 2, and the second input/output switching unit 18 is disposed between the output terminal 3 and the terminal 16. The first input/output switching unit 17 and the second input/output switching unit 18 are constituted by an electromagnetic relay.

The first input/output switching unit 17 switches connection destinations from the input terminal 2 to the outside. The first input/output switching unit 17 has terminals a1, b1, c1, and d1 and selects either the terminals a1 and b1, or the terminals c1 and d1. The second input/output switching 18 unit switches connection destinations from the output terminal 3 to the outside. The second input/output switching unit 18 has terminals a2, b2, c2, and d2, and selects either the terminals a2 and b2, or the terminals c2 and d2.

A power line 19*a* is connected to the terminal a1 and to the terminal c2. A power line 19*b* is connected to the terminal b1 and to the terminal d2. A power line 19*c* is connected to the terminal c1 and to the terminal a2. A power line 19*d* is connected to the terminal d1 and to the terminal b2.

Next, operation of the first input/output switching unit 17 and the second input/output switching unit 18 will be described. First, when an AC power source is connected to the terminal 15, the first input/output switching unit 17 selects the terminals a1 and b1, and the second input/output switching unit 18 selects the terminals a2 and b2. As a result, the AC from the AC power source is input to the first conversion circuit 4 via the input terminal.

When the first input/output switching unit 17 selects the terminals c1 and d1, a DC power source is connected to the terminal 16, and DC is input to the first conversion circuit 4 via the power lines 19*c* and 19*d*, the terminals c1 and d1, and the input terminal 2.

In the power conversion device according to the sixth embodiment, even if the power conversion device 1*e* has the terminals fixed in advance, it is possible to select whether an AC power source or a DC power source is connected to the input terminal 2 in the power conversion device 1*e*.

Seventh Embodiment

Figure 9:
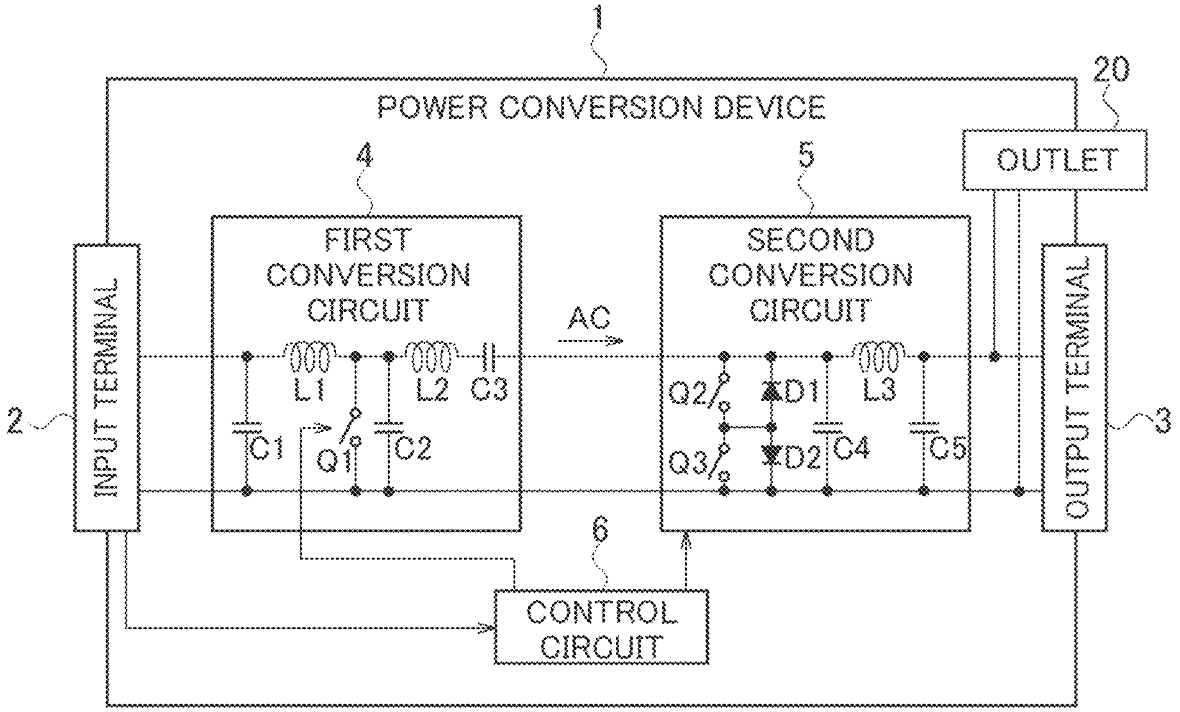
FIG. 9 is a block diagram showing a configuration a power conversion device according to seventh embodiment of the present invention.

FIG. 9 is a block diagram showing a configuration of the power conversion device according to a seventh embodiment of the present invention. In the power conversion device according to the seventh embodiment an outlet 20 is added to the configuration of the power conversion device according to the first embodiment.

The outlet 20 is connected to the capacitor C5 and the output terminal 3. In this case, DC power is input to the input terminal 2 to the first conversion circuit 4, and the second conversion circuit 5 supplies AC power to the output terminal 3. The outlet 20 is connected to the output terminal 3, so that output AC power can be supplied to an external load or the like.

In the power conversion device according to the seventh embodiment, a load using AC power can be used without connecting the outlet 20 as a separate device for connecting the inlet of the device using AC power.

INDUSTRIAL APPLICABILITY

The power conversion device of the present invention can be applied to charging a storage battery from AC power and to external power supply from an electric vehicle.

REFERENCE SIGNS LIST

1 Power conversion device
2 Input terminal
3 Output terminal
4 First conversion circuit
5 Second conversion circuit
6, 6*a* to 6*e* Control circuit
7 First communication interface
8 Second communication interface
9*a*, 19*a* to 19*d* Power line
9*b* Signal line
10 Power storage system
11 Storage battery
13 Switching button
15, 16 terminal
17 First input/output switching unit
18 Second input/output switching unit
20 Outlet
Q1, Q2, Q3 Switching element
L1, l2, l3 Inductor
C1 to C5 Capacitor

The invention claimed is:

1. A method of controlling a power conversion device comprising:

an input terminal and an output terminal;

a first conversion circuit having a first switching element for switching at a high speed and converting a power input from the input terminal into first AC power;

a second conversion circuit having a second switching element for selecting polarity of an output, converting the first AC power input from the first conversion circuit, and outputting it to the output terminal; and a control circuit for controlling operation of the first switching element and the second switching element;

wherein operation of the first switching element and the second switching element of the power conversion device is controlled;

the method comprising:

determining whether input power to the input terminal is AC or DC;

controlling the operation of the first switching element and the second switching element so that the second conversion circuit outputs DC power when it is determined that the input power is AC; and controlling the operation of the first switching element and the second switching element so that the second conversion circuit outputs the DC power or a second AC power when it is determined that the input power is DC.

2. The method of controlling a power conversion device according to claim 1, the power conversion device further comprising a second communication interface for communicating with the outside, the method further comprising:

determining whether a power storage system having a storage battery is connected to the output terminal;

communicating with the power storage system via the second communication interface when it is determined that the input power to the input terminal is AC and when it is determined that the power storage system having the storage battery is connected to the output terminal; and receiving a charging command from the power storage system and controlling the operation of the first switching element and the second switching element so as to control charging of the storage battery in response to the charging command.

3. The method of controlling a power conversion device according to claim 1, the power conversion device further comprising a first communication interface for communicating with the outside, the method further comprising:

determining whether a power storage system having a storage battery is connected to the input terminal;

communicating with the power storage system via the first communication interface when it is determined that the input power to the input terminal is DC, and when it is determined that the power storage system having the storage battery is connected to the input terminal; and controlling the operation of the first switching element and the second switching element so as to control an output from the storage battery connected to the input terminal to the output terminal.

4. The method of controlling a power conversion device according to claim 3, further comprising:

communicating with the power storage system via the first communication interface and receiving a DC output command from the power storage system;

controlling the operation of the first switching element and the second switching element so as to output the DC power to the output terminal when the DC output command is received; and receiving an AC output command from the power storage system and controlling the operation of the first switching element and the second switching element so as to output the second AC power to the output terminal when the AC output command is received.

5. The method of controlling a power conversion device according to claim 3, further comprising:

selecting whether to output the DC power or the second AC power to the output terminal;

controlling the operation of the first switching element and the second switching element so as to output the DC power to the output terminal when the DC power is selected; and controlling the operation of the first switching element and the second switching element so as to output the second AC power to the output terminal when the second AC power is selected.

6. The method of controlling a power conversion device according to claim 3, further comprising:

communicating with the power storage system connected to the input terminal via the first communication interface and receiving information on output allowable current of the power storage system from the power storage system connected to the input terminal; and controlling the operation of the first switching element and the second switching element so that the current input from the input terminal does not exceed the output allowable current based on the output allowable current received.

7. The method of controlling a power conversion device according to claim 3, further comprising:

determining whether the power storage system having a storage battery is connected to the input terminal;

determining whether the power storage system having the storage battery is connected to the output terminal;

communicating with the power storage system connected to the input terminal via the first communication interface when it is determined that the input power to the input terminal is DC, when it is determined that the power storage system having the storage battery is connected to the input terminal, and when it is determined that the power storage system having the storage battery is connected to the output terminal; and controlling the operation of the first switching element and the second switching element so as to control charging from the power storage system connected to the input terminal to the power storage system connected to the output terminal.

8. The method of controlling a power conversion device according to claim 7, further comprising:

receiving information on output allowable current of the power storage system connected to the input terminal from the power storage system connected to the input terminal;

receiving information on input allowable current and information on input allowable voltage of the power storage system connected to the output terminal from the power storage system connected to the output terminal; and controlling the operation of the first switching element and the second switching element so that current input from the input terminal does not exceed the output allowable current of the power storage system connected to the input terminal, and so that the current and voltage output from the output terminal do not exceed the input allowable current and the input allowable voltage of the power storage system connected to the output terminal.

9. A power conversion device comprising:

an input terminal and an output terminal;

a first conversion circuit having a first switching element for switching at a high speed and converting a power input from the input terminal into first AC power;

a second conversion circuit having a second switching element for selecting polarity of an output, converting the first AC power input from the first conversion circuit and outputting it to the output terminal; and a control circuit for controlling operation of the first switching element and the second switching element;

wherein:

the control circuit determines whether input power to the input terminal is AC or DC;

the operation of the first switching element and the second switching element is controlled so that the second conversion circuit outputs DC power when it is determined that the input power is AC; and the operation of the first switching element and the second switching element is controlled so that the second conversion circuit outputs the DC power or second AC power having a frequency lower than the frequency of the first AC power when it is determined that the input power is DC.

10. The power conversion device according to claim 9, wherein:

the first conversion circuit comprises an input inductor disposed between the input terminal and the first switching element, an LC resonance circuit disposed between the first switching element and an output of the first conversion circuit, and a capacitor connected in parallel with the first switching element; and the first conversion circuit is a voltage resonant inverter circuit that outputs the first AC power to the second conversion circuit.

11. The power conversion device according to claim 9, further comprising a communication unit for communicating with the outside, the communication unit having a first communication interface arranged at the input terminal and a second communication interface arranged at the output terminal;

wherein the control circuit controls the operation of the first switching element and the second switching element based on a command obtained from the outside via the communication unit.

12. The power conversion device according to claim 9, wherein the input terminal and the output terminal are formed in the same way.

13. The power conversion device according to claim 9, further comprising:

a first switching unit for switching connection destinations from the input terminal to the outside; and a second switching unit for switching connection destinations from the output terminal to the outside.

14. The power conversion device according to claim 9, further comprising an outlet to which the AC power can be supplied when DC power is input to the input terminal and AC power is supplied to the output terminal.

* * * * *